(12) United States Patent
Matsumoto et al.

(10) Patent No.: US 7,154,472 B2
(45) Date of Patent: Dec. 26, 2006

(54) FORCE-FEEDBACK INPUT DEVICE

(75) Inventors: Ken Matsumoto, Iwate-ken (JP); Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 473 days.

(21) Appl. No.: 10/813,360

(22) Filed: Mar. 30, 2004

(65) Prior Publication Data

US 2004/0201605 A1 Oct. 14, 2004

(30) Foreign Application Priority Data

Apr. 14, 2003 (JP) .............................. 2003-109080

(51) Int. Cl.
*G09G 5/00* (2006.01)
*G09G 5/08* (2006.01)
*G05B 15/00* (2006.01)

(52) U.S. Cl. ...................... 345/156; 345/157; 345/161; 345/167; 700/85; 700/44; 700/45; 463/37; 463/38; 348/211.7

(58) Field of Classification Search .................. 700/44, 700/45, 54, 56, 85, 83, 84, 17; 345/156, 345/167, 161, 157; 348/211.7; 463/37, 463/38

See application file for complete search history.

(56) References Cited

U.S. PATENT DOCUMENTS

| | | | | |
|---|---|---|---|---|
| 6,184,868 B1 * | 2/2001 | Shahoian et al. | ........... | 345/161 |
| 6,411,276 B1 * | 6/2002 | Braun et al. | ................ | 345/156 |
| 6,703,550 B1 * | 3/2004 | Chu | ............................ | 84/609 |
| 6,707,443 B1 * | 3/2004 | Bruneau et al. | ............ | 345/156 |
| 6,750,877 B1 * | 6/2004 | Rosenberg et al. | ......... | 715/701 |
| 6,819,312 B1 * | 11/2004 | Fish | ............................ | 345/156 |
| 2003/0067440 A1 * | 4/2003 | Rank | .......................... | 345/156 |
| 2004/0174387 A1 * | 9/2004 | Nonaka | ...................... | 345/684 |
| 2004/0195987 A1 * | 10/2004 | Hayasaka | .................... | 318/432 |
| 2005/0085299 A1 * | 4/2005 | Murzanski et al. | ........... | 463/38 |

FOREIGN PATENT DOCUMENTS

JP 2001-84875 3/2001

* cited by examiner

*Primary Examiner*—Ramesh Patel
(74) *Attorney, Agent, or Firm*—Brinks Hofer Gilson & Lione

(57) ABSTRACT

A force-feedback input device includes an operation section to be operated by an operator; a position detection section for detecting the operating state of the operation section; a force-feedback generation section for applying force feedback to the operation section; an external device, and a haptic commander for controlling the driving of the force-feedback generation section on the basis of position information output from the position detection section and part data transmitted from the external device, and applying predetermined force feedback to the operation section according to the operating state thereof. The haptic commander includes a part data storage section for storing the part data transmitted from the external device, and a part data management table for managing the enabled and disabled states of each piece of the part data stored in the part data storage section.

3 Claims, 3 Drawing Sheets

FORCE-FEEDBACK INPUT DEVICE

This application claims the benefit of priority to Japanese Patent Application No. 2003-109080, herein incorporated by reference.

BACKGROUND OF THE INVENTION

1. Field of the Invention

The present invention relates to a force-feedback input device that applies, to an operation section, force feedback in accordance with the operating state of the operation section, and more particularly, to means for updating part data, which is used as a basis for applying the force feedback.

2. Description of the Related Art

Conventionally, a force-feedback input device is known as an input device applied to, for example, so-called by-wire devices, such as a central control device for car-mounted electric devices, such as a steering device, a gearshift device, or a brake device. Such input devices include an operation section to be operated by an operator, a position detection section for detecting an operating state of the operation section, a force-feedback generation section for applying force feedback to the operation section, a display section for displaying the operating state and the operation contents of the operation section, and a haptic commander for controlling the driving of the force-feedback generation section, applying force feedback to the operation section according to the operating state thereof, and controlling the driving of the display section (for example, refer to Japanese Unexamined Patent Application Publication No. 2001-84875 (see FIG. 1)).

According to this force-feedback input device, since various force feedbacks in accordance with the direction, amount, or the like of the operation can be applied to the operation section by driving the force-feedback generation section, a required operation sensation can be given to the operation of the operation section in various by-wire devices.

The application of force feedback to the operation section in a central control device for car-mounted electric devices is performed in such a manner that, when the car-mounted electric device is selected or the function of the car-mounted electric device is selected as a result of operating the operation section, a force-feedback pattern in accordance with the selected car-mounted electric device or the function of the selected car-mounted electric device is set in the haptic commander.

For example, in a case where a central control device for car-mounted electric devices is activated, and the selection button of the type of car-mounted electric device, which can be controlled by the central control device, for example, an air conditioner, a CD player, an MD player, a DVD player, a radio, a television, a telephone, and a car navigation system, and the cursor are displayed on the display section, force-feedback patterns are set in the haptic commander. Examples of the force-feedback patterns are a wall surface for guiding, from a predetermined position, the operation section only in eight directions, which are the arrangement directions of each selection button, a retraction point at which the cursor is retracted to the center position of each selection button, a damper for providing, to the operation of the operation section, a sensation of expanding or compressing a spring, and a friction force of providing a fixed resisting sensation to the operation of the operation. When, for example, an air conditioner is selected by selecting the selection button, selection buttons for indicating temperature, the amount of wind, and the blowoff opening, which are adjustable in the air conditioner, and the cursor are displayed on the next screen, and a force-feedback pattern including a wall surface for guiding, from a predetermined position, the operation section only in three directions, which are arrangement directions of each selection button, is set in the haptic commander.

Methods for setting a force-feedback pattern in the haptic commander include a part data transmission method for transmitting part data used to generate a required force-feedback pattern to the haptic commander from an external device, such as a microcomputer, to which the force-feedback input device is connected, each time the display screen is changed, and a force-feedback table storage method having tables corresponding to force-feedback patterns formed in such a manner that required part data transmitted from an external device to the haptic commander is combined.

The setting of a force-feedback pattern by the part data transmission method has the advantages that, since adjustment of a set position, correction of a shape, correction of a force generation parameter, etc., are possible in units of part data, a force-feedback pattern that is easy for an operator to use can be easily generated, and since part data created at an external device is transmitted to the haptic commander, the addition of a force-feedback pattern can be easily performed. On the other hand, the part data transmission method has the disadvantages that, since required part data must be transmitted from an external device to the haptic commander each time the display screen is changed, the larger the number of pieces of part data to be transmitted, the longer the transmission time of the part data, and when a control method in which force feedback is not generated unless all the part data is transmitted is adopted, the switching response of the force-feedback pattern becomes deteriorated. Furthermore, in a case where a control method in which force feedback based on the transmitted part data is generated each time the transmission of each piece of the part data is completed is adopted, since undesirable force feedback acts on the operation section depending on the transmitted part data, disadvantages arise in that the ease of operation of the operation section becomes deteriorated.

On the other hand, for the setting of a force-feedback pattern by the force-feedback table storage method, a desired force-feedback pattern can be set by merely transmitting a command indicating a desired table number to the haptic commander from an external device, and desired force-feedback patterns can be activated collectively as a whole rather than in units of part data, thus making it possible to overcome the disadvantages of the part data transmission method. But nevertheless, since the haptic commander must be provided with a large-capacity storage device, another disadvantage arises in that the cost of the force-feedback input device is increased. Also, since the force-feedback patterns are handled as a whole rather than in units of part data, in order to change the set position, the shape, and the force generation pattern, and so forth of part data, updating of all the part data stored in the table becomes necessary, and there is a disadvantage in that the correction of the part data cannot be easily performed. Furthermore, in order to enable the addition of a force-feedback pattern that can be handled by the force-feedback input device, an expensive data recordable or rewritable storage device is required, and if an inexpensive read-only storage device is provided to achieve a lower cost of the force-feedback input device, the addition of a force-feedback pattern by a user (operator) becomes impossible, and there is thus another disadvantage in that the expandability of functions is limited.

SUMMARY OF THE INVENTION

The present invention has been made to solve such inadequacies of the related art. An object of the present invention is to provide an inexpensive force-feedback input device that is capable of quickly changing a force-feedback pattern, by which addition and correction of a force-feedback pattern are easy, and that has a high function expandability.

To achieve the above-mentioned object, the present invention provides a force-feedback input device including: an operation section to be operated by an operator; a position detection section for detecting an operating state of the operation section; a force-feedback generation section for applying force feedback to the operation section; an external device; and a haptic commander for controlling the driving of the force-feedback generation section on the basis of position information output from the position detection section and part data transmitted from the external device and for applying, to the operation section, predetermined force feedback corresponding to the operating state thereof. The haptic commander comprises a part data storage section for storing the part data transmitted by the external device, and a part data management table for managing the enabled and disabled states of each piece of part data stored in the part data storage section. The haptic commander switches between the enabled and disabled states of the part data registered in the part data management table in accordance with a management table updating command transmitted by the external device, controls the driving of the force-feedback generation section on the basis of the part data which is enabled by the management table updating command, and applies predetermined force feedback in accordance with the operating state to the operation section.

As described above, if part data transmitted from an external device is prestored in the part data storage section provided in the haptic commander, and the enabled and disabled states of each piece of the stored part data are switched in accordance with a management table updating command transmitted from the external device, when compared to the case where the force-feedback pattern is switched by transmitting part data from the external device to the haptic commander, the amount of data to be transmitted from the external device to the haptic commander can be decreased, the load on the external device can be reduced, and also the switching of the force-feedback pattern can be easily and quickly performed. Furthermore, since the switching of the force-feedback pattern can be easily and quickly performed, the force-feedback pattern can be changed differently at several stages so that the switched force-feedback pattern and the operation section do not interfere with each other. Thus, it is possible to reliably prevent interference between the force-feedback pattern and the operation section, which is caused by the switching of the force-feedback pattern, and the ease of operation of the operation section can thus be made satisfactory. Furthermore, since a variety of force-feedback patterns can be generated by a smaller number of pieces of part data by switching between the enabled and disabled states of the part data, when compared to the case where necessary part data is stored for each force-feedback pattern in the storage device, the number of pieces of part data to be stored in the storage device (part data storage section) can be decreased, and thus the cost of the force-feedback input device can be reduced due to a reduction in the storage capacity of the storage device. Furthermore, since the part data transmitted from the external device is stored in the part data storage section, which is a data recordable or rewritable storage device, the set position, the shape, a force generation parameter, and so forth of the part data can be easily changed, and thus the flexibility of the force-feedback input device can be improved, such as the operation sensation being adjusted in accordance with the preference of the user. Furthermore, since part data can be transmitted from the external device to the haptic commander as desired, the addition of a force-feedback pattern which can be handled by the force-feedback input device is easy, and the expandability of the functions of the force-feedback input device can be increased.

In the part data management table, preferably, the enabled and disabled states of the part data are managed by switching a flag assigned for each piece of the part data.

In general, since 16-byte data is communicated between the external device and the haptic commander, if the flag assigned for each piece of the part data is switched in accordance with a 16-byte management table updating command, switching of a maximum of 122 pieces of part data can be performed at the same time, and a variety of force feedbacks can be applied to the operation section, making it possible to increase the multi-functionality of the force-feedback input device.

In the force feedback of the above configuration, preferably, a display section is connected to the haptic commander, and when the management table updating command is transmitted from the external device, the updating of the part data management table and the screen switching of the display section are performed.

In the manner described above, when the display section is connected to the haptic commander, and the updating of the part data management table and the screen switching of the display section are performed in synchronization with each other, it is possible for the operator to confirm which operation is to be performed by operating the operation section by not only force feedback, but also visually. As a result, the ease of operation of the force-feedback input device can be improved further.

DESCRIPTION OF THE PREFERRED EMBODIMENTS

Figure 1:
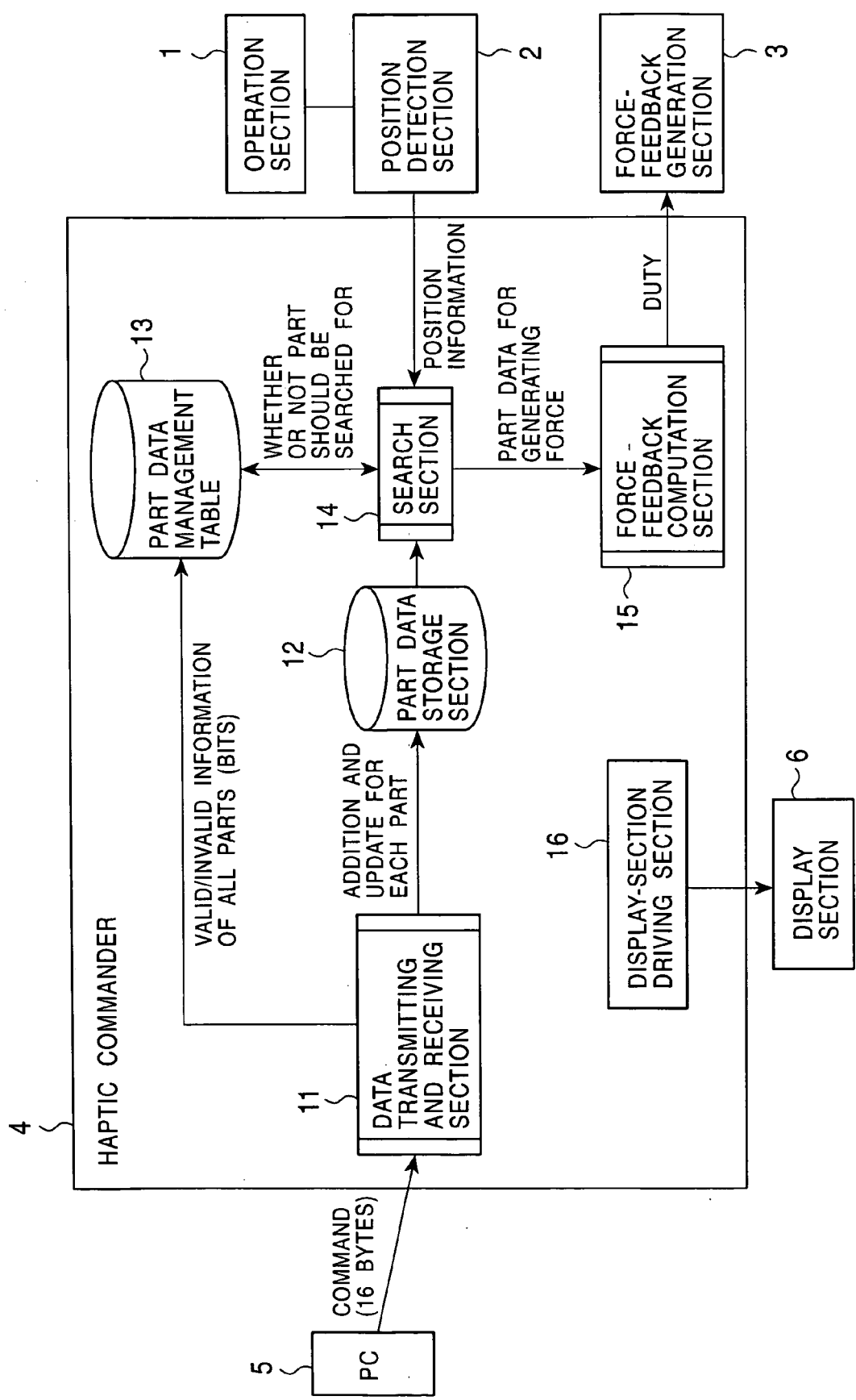
FIG. 1 is a configuration view of a force-feedback input device according to an embodiment of the present invention.
Figure 2:
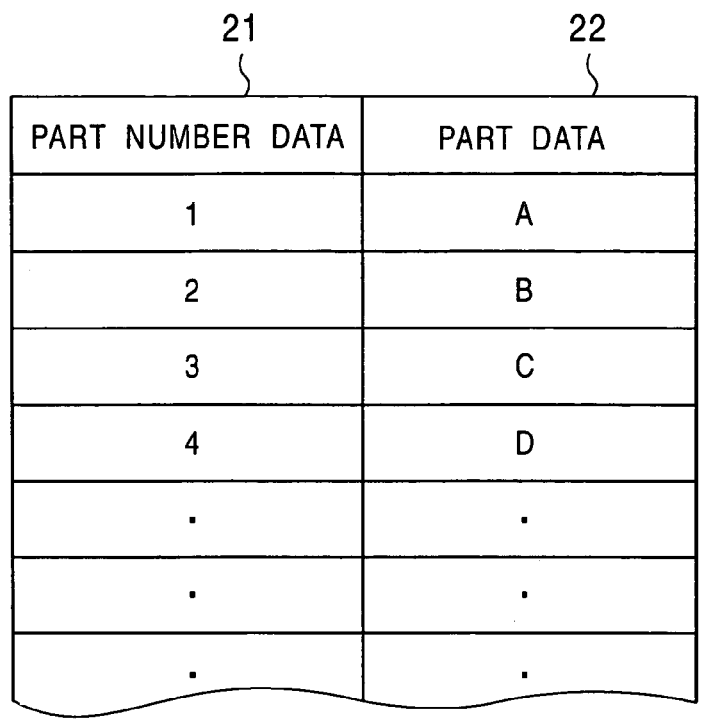
FIG. 2 is a table showing an example of the format structure of a part data storage section.
Figure 3:
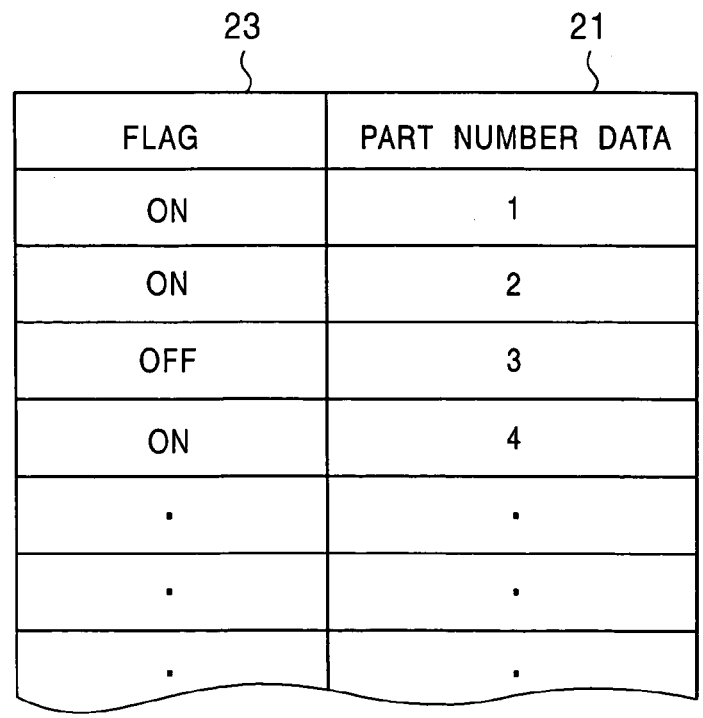
FIG. 3 is a table showing an example of the format structure of a part data management table.

The configuration of a force-feedback input device embodiment of the present invention will now be described below with reference to FIGS. 1 to 3. FIG. 1 is a configuration view of a force-feedback input device according to an embodiment of the present invention. FIG. 2 is a table showing an example of the format structure of a part data storage section. FIG. 3 is a table showing an example of the format structure of a part data management table.

As shown in FIG. 1, the force-feedback input device of this embodiment mainly includes an operation section 1 to be operated by an operator, a position detection section 2 for detecting the operating state of the operating unit 1, a force-feedback generation section 3 for applying force feedback to the operation section 1, a haptic commander 4 for applying predetermined force feedback to the operation section 1 according to the operating state thereof, an external device 5 for transmitting part data and a management table updating command to the haptic commander 4, and a display section 6 whose driving is controlled by the haptic commander 4.

The operation section 1 is operated manually by an operator, and, for example, one of a rotary knob, a swing lever, and a joystick, is used therefor as appropriate.

The position detection section 2 converts the amount of operation and the operation direction of the operation section 1 into electrical amounts and outputs them, and usually, a rotary encoder capable of outputting a two-phase signal pulse is used therefor.

The force-feedback generation section 3 applies predetermined force feedback to the operation section 1, and a rotary motor, a linear motor, or a solenoid is used therefor. In a case where a linear motor or a solenoid is used for the force-feedback generation section 3, a required motion transmission mechanism for converting the linear motion of the force-feedback generation section 3 into rotational motion and transmitting it to the operation section 1 is provided between the force-feedback generation section 3 and the operation section 1.

The external device 5 transmits part data, which is used as a basis for applying force feedback to the haptic commander 4, and a management table updating command for selecting only part data required to generate desired force feedback, the external device 5 being formed of a microcomputer.

The display section 6 displays the contents of input to be performed by operating the operation section in a visual form, and any known data display device can be used therefor.

As shown in FIG. 1, the haptic commander 4 includes a data transmitting and receiving section 11 for transmitting and receiving data to and from the external device 5; a part data storage section 12 for storing part data transmitted from the external device 5; a part data management table 13 for managing the enabled and disabled states of each piece of the part data stored in the part data storage section 12; a search section 14 for searching the part data storage section 12 for the part data which is enabled in accordance with management data output from the part data management table 13 and for generating a predetermined force-feedback pattern; a force-feedback computation section 15 for generating a driving signal for the force-feedback generation section 3 on the basis of a force-feedback pattern generated in the search section 14 and the position information output from the position detection section 2; and a display-section driving section 16 for controlling the driving of the display section 6.

For the data transmitting and receiving section 11, any known communication interface can be used. In order to prevent a higher cost of the force-feedback input device, in particular, a 16-byte serial interface, which is conventionally used in this type of input device, is preferably used.

The part data storage section 12 is formed of a data recordable or rewritable storage device, and as shown in FIG. 2, part number data 21, and part data 22 corresponding to the part number data 21 are stored in such a manner as to be capable of being individually read.

The part data management table 13 is also formed of a data recordable or rewritable storage device, and as shown in FIG. 3, it is formed of the part number data 21 and a flag 23 added for each piece of the part number data 21. The on and off states of the flag 23 are switched for each of the pieces of the part number data 21 in accordance with the management table updating command transmitted from the external device 5 so as to manage validity and invalidity of each piece of the part data 22 corresponding to each of the part number data 21. In this case, the part data for which the flag is set on can be enabled, and the part data for which the flag is set off can be disabled. Contrary to this, the part data for which the flag is set off can be enabled, and the part data for which the flag is set on can be disabled.

The search section 14 reads, from the part data storage section 12, the part data 22 to which the corresponding part number data 21 is given on the basis of the management data output from the part data management table 13, that is, the part number data 21 for which the valid flag 23 is set, and generates a predetermined force-feedback pattern by combination this data.

The force-feedback computation section 15 computes a relative position of the set position of the force-feedback pattern generated in the search section 14 and the operation position (the position of the cursor displayed on the display section 6) of the operation section 1, which is specified by the position information output from the position detection section 2, and generates and outputs a driving signal for the force-feedback generation section 3 on the basis of the correlation table among the predetermined force-feedback patterns, the relative position, and the driving signal. For example, in a case where a force-feedback pattern for creating a wall surface for regulating the movement direction of the operation section 1 is set, when the set position of the force-feedback pattern matches the operation position of the operation section 1, a driving signal for applying, to the operation section 1, force feedback as if the operation section 1 struck against the wall surface is output. Furthermore, in a case where a force-feedback pattern for retracting the operation section 1 to a predetermined retraction point is set, when the operation position of the operation section 1 reaches a predetermined retraction starting point, a driving signal for retracting the operation section 1 up to the retraction point, where it is stably held, is output.

The display-section driving section 16 changes the display screen of the display section 6 in accordance with the force-feedback pattern generated at the search section 14, and displays the cursor as necessary on the display screen. For example, in a case where the force feedback is activated, and a force-feedback pattern for selecting an air conditioner, a CD player, an MD player, a DVD player, a radio, a television, a telephone, and a car navigation system, which are car-mounted electric devices, is generated, the selection buttons for these car-mounted electric devices are displayed on the display section 6 at a predetermined arrangement, and a cursor for selecting a desired selection button is displayed on the display section 6. In a case where, for example, an air conditioner is selected by selecting the selection button, and as a result, temperature, the amount of wind, and the blowoff opening, which are adjustable in the air conditioner, is generated, the selection buttons indicating the functions of the air conditioner, are displayed on the display section 6 at a predetermined arrangement, and the cursor for selecting a desired selection button is displayed on the display section 6.

Figure 4:
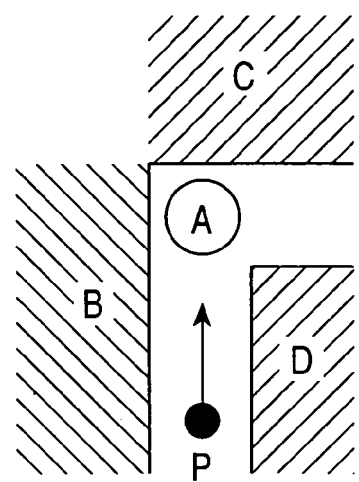
FIG. 4 is an illustration showing a first example of a force-feedback pattern.
Figure 5:
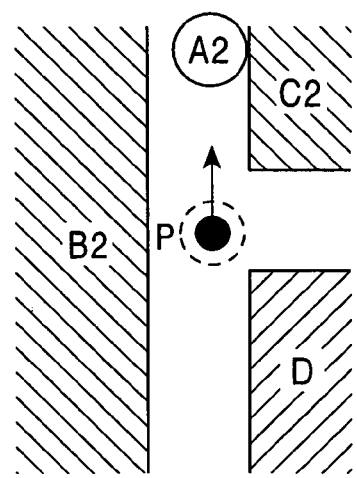
FIG. 5 is an illustration showing a second example of the force-feedback pattern.
Figure 6:
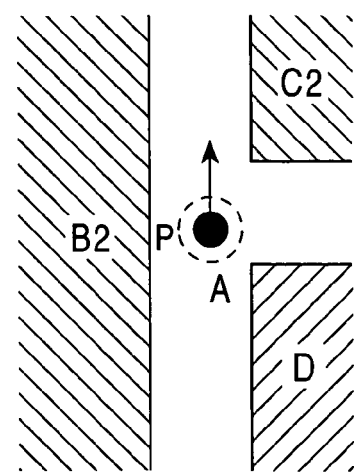
FIG. 6 is an illustration showing a third example of the force-feedback pattern.

A description will now be given, with reference to FIGS. 4 to 6, of a method for generating a specific force-feedback pattern in the force-feedback input device according to the embodiment of the present invention. FIG. 4 is an illustration showing a first example of a force-feedback pattern. FIG. 5 is an illustration showing a second example of the force-feedback pattern. FIG. 6 is an illustration showing a third example of the force-feedback pattern.

In a case where retraction points A and A2, and wall surfaces B, B2, C, C2, and D, shown in FIGS. 4 to 6, are stored as the part data 22 in the part data storage section 12 of the haptic commander 4, when only the retraction point A and the wall surfaces B, C, and D are enabled, and when the retraction point A2 and the wall surfaces B2 and C2 are disabled, the force-feedback pattern shown in FIG. 4 is generated. When only the retraction point A2 and the wall surfaces B2, C2, and D are enabled, and when the retraction point A and the wall surfaces B and C are disabled, the force-feedback pattern shown in FIG. 5 is generated. When only the retraction point A and the wall surfaces B2, C2, and D are enabled, and when the retraction point A2 and the wall surfaces B and C are disabled, the force-feedback pattern shown in FIG. 6 is generated. The change from the force-feedback pattern of FIG. 4 to the force-feedback pattern of FIG. 5 can be performed by disabling the retraction point A and the wall surfaces B and C and by enabling the retraction point A2 and the wall surfaces B2 and C2. Furthermore, the change from the force-feedback pattern of FIG. 4 to the force-feedback pattern of FIG. 6 can be performed by disabling the wall surfaces B and C and by enabling the wall surfaces B2 and C2. Furthermore, the change from the force-feedback pattern of FIG. 6 to the force-feedback pattern of FIG. 5 can be performed by disabling the retraction point A and by enabling the retraction point A2.

In the manner described above, in the force-feedback input device of this embodiment, since a variety of force-feedback patterns can be generated instantaneously by merely controlling the enabled and disabled states of the part data 22 stored in the part data storage section 12, the amount of data to be transmitted from the external device 5 to the haptic commander 4 can be decreased, and the switching response of the force-feedback pattern can be sped up.

For changing from the force-feedback pattern of FIG. 5 to the force-feedback pattern of FIG. 4, in order to prevent the operation section 1 retracted to the retraction point A2 from interfering with the wall surface C after the force-feedback pattern is changed so as to prevent a large force from suddenly acting on the operation section 1, first, the interference between the operation section 1 and the wall surface C is prevented by changing from the force-feedback pattern of FIG. 5 to the force-feedback pattern of FIG. 6, and the operation section 1 is held stably at the retraction point A, after which the force-feedback pattern of FIG. 6 is changed to the force-feedback pattern of FIG. 4.

As a result, a large force is prevented from suddenly acting on the operation section 1, and stable control of the operation section 1 becomes possible.

In the force-feedback input device of this embodiment, the part data 22 transmitted from the external device 5 is prestored in the part data storage section 12 provided in the haptic commander 4, and the enabled and disabled states of each piece of the stored part data 22 are switched in accordance with the management table updating command transmitted from the external device 5. Therefore, when compared to the case where the force-feedback pattern is switched by transmitting the part data 22 from the external device 5 to the haptic commander 4, the amount of data to be transmitted from the external device 5 to the haptic commander can be decreased, the load on the external device can be reduced, and the switching of the force-feedback pattern can be easily and quickly performed. Also, since the switching of the force-feedback pattern can be easily and quickly performed, the force-feedback pattern can be changed differently at several stages, so that the interference between the force-feedback pattern and the operation section, caused by the switching of the force-feedback pattern, can be reliably prevented. Thus, it is possible to reliably prevent interference between the force-feedback pattern and the operation section, which is caused by the switching of the force-feedback pattern, and the ease of operation of the operation section can thus be made satisfactory. Furthermore, since a variety of force-feedback patterns can be generated by a smaller number of pieces of part data by switching between the enabled and disabled states of the part data, when compared to the case where necessary part data 22 is stored for each force-feedback pattern in the storage device, the number of pieces of part data to be stored in the storage device (the part data storage section 12) can be decreased, and thus the cost of the force-feedback input device can be reduced due to a reduction in the storage capacity of the storage device. Furthermore, since the part data 22 transmitted from the external device 5 is stored in the part data storage section 12, which is a data recordable or rewritable storage device, the set position, the shape, a force generation parameter, and so forth of the part data 22 can be easily changed, and thus the flexibility of the force-feedback input device can be improved, such as the operation sensation being adjusted in accordance with the preference of the user. Furthermore, since the part data 22 can be transmitted from the external device 5 to the haptic commander 4 as desired, the addition of a force-feedback pattern which can be handled by the force-feedback input device is easy, and the expandability of the functions of the force-feedback input device can be increased.

Furthermore, in the force-feedback input device of this embodiment, since the enabled and disabled states of part data 22 are managed by switching the flag 23, a large number of part data 22 can be switched simultaneously, and thus the force-feedback input device has multi-functionality and a high response of the force-feedback pattern.

In addition, in the force-feedback input device of this embodiment, since the haptic commander 4 is connected to the display section 6, and the updating of the part data management table 13 and the screen switching of the display section 6 are performed in synchronization, it is possible for the operator to confirm which operation is to be performed by operating the operation section by not only force feedback, but also visually. The ease of operation of the force-feedback input device can thus be improved further.

The invention claimed is:

1. A force-feedback input device comprising:
an operation section to be operated by an operator;
a position detection section for detecting an operating state of the operation section;
a force-feedback generation section for applying force feedback to the operation section;
an external device; and
a haptic commander for controlling driving of the force-feedback generation section on the basis of position information output from said position detection section and part data transmitted from said external device and for applying, to said operation section, predetermined force feedback corresponding to the operating state thereof, wherein said haptic commander comprises a part data storage section for storing said part data transmitted by said external device, and a part data management table for managing the enabled and disabled states of each piece of part data stored in the part data storage section, and said haptic commander switches between the enabled and disabled states of said part data registered in said part data management table in accordance with a management table updating command transmitted by said external device, controls the driving of said force-feedback generation section on the basis of said part data which is enabled by said management table updating command, and applies, to said operation section, predetermined force feedback in accordance with the operating state thereof.

2. A force-feedback input device according to claim 1, wherein, in said part data management table, the enabled and disabled states of said part data are managed by switching a flag assigned for each piece of said part data.

3. A force-feedback input device according to claim 1, wherein a display section is connected to said haptic commander, and when said management table updating command is transmitted from said external device, the updating of said part data management table and the screen switching of said display section are performed.

* * * * *

UNITED STATES PATENT AND TRADEMARK OFFICE
CERTIFICATE OF CORRECTION

PATENT NO. : 7,154,472 B2
APPLICATION NO. : 10/813360
DATED : December 26, 2006
INVENTOR(S) : Ken Matsumoto et al.

It is certified that error appears in the above-identified patent and that said Letters Patent is hereby corrected as shown below:

On the Title Page

In column 2, line 2, after "6,703,550" delete "B1" and substitute --B2-- in its place.

In column 2, line 3, after "6,707,443" delete "B1" and substitute --B2-- in its place.

In column 2, line 4, after "6,750,877" delete "B1" and substitute --B2-- in its place.

In column 2, line 5, after "6,819,312" delete "B1" and substitute --B2-- in its place.

In the Claims

Columns 8-9, in claim 1, line 18, after "for managing" delete "the".

Signed and Sealed this

First Day of May, 2007

JON W. DUDAS
*Director of the United States Patent and Trademark Office*